United States Patent
Ohkawa et al.

(10) Patent No.: US 8,457,444 B2
(45) Date of Patent: Jun. 4, 2013

(54) COMMUNICATION APPARATUS

(75) Inventors: Tomoki Ohkawa, Tokyo (JP); Shinichi Shirasaka, Tokyo (JP); Naoyuki Uramatsu, Tokyo (JP); Shinji Takahashi, Tokyo (JP); Tetsuya Katsumata, Tokyo (JP)

(73) Assignee: Pioneer Corporation, Tokyo (JP)

( * ) Notice: Subject to any disclaimer, the term of this patent is extended or adjusted under 35 U.S.C. 154(b) by 2234 days.

(21) Appl. No.: 10/935,111

(22) Filed: Sep. 8, 2004

(65) Prior Publication Data

US 2005/0052528 A1    Mar. 10, 2005

(30) Foreign Application Priority Data

Sep. 10, 2003    (JP) ................. P2003-318605

(51) Int. Cl.
*G06K 9/32*    (2006.01)
*G06K 9/36*    (2006.01)
(52) U.S. Cl.
USPC ......................................... 382/298; 382/232
(58) Field of Classification Search
USPC .................. 348/14.08; 382/232, 298
See application file for complete search history.

(56) References Cited

U.S. PATENT DOCUMENTS

2001/0010545 A1*  8/2001  Sasaki .......................... 348/213
2003/0112335 A1*  6/2003  Strandwitz et al. ........ 348/211.2

FOREIGN PATENT DOCUMENTS

| JP | 7-284078 A | 10/1995 |
| JP | 09-289634 A | 11/1997 |
| JP | 09-289635 A | 11/1997 |
| JP | 10-079930 A | 3/1998 |
| JP | 2000-165846 A | 6/2000 |
| JP | 2001-069472 A | 3/2001 |
| JP | 2001-177820 A | 6/2001 |

OTHER PUBLICATIONS

Japanese Office Action dated Jun. 2, 2009.

* cited by examiner

*Primary Examiner* — John Strege
(74) *Attorney, Agent, or Firm* — Sughrue Mion, PLLC

(57) ABSTRACT

A communication apparatus includes: a display state detecting unit that detects a display state of an image to be displayed on the basis of a received moving image data; and a control information transmitting unit that transmits, to a transmission source of the moving image data, control information regarding transmission of the image data, in accordance with the display state.

9 Claims, 17 Drawing Sheets

- HIERARCHY RANK Z IN ABOVE VIEW IS
  - Z4 → NO.1
  - Z3 → NO.3
  - Z2 → NO.2
  - Z1 → NO.4
  - Z0 → NO.0

FIG. 13

SUMMATION OF SCREEN DISPLAY AREA WITH UPPER HIERARCHY RANK THAN [OTHER PARTY SCREEN AREA] REPRESENTED BY
$S = A(N-1) \vee A(N-2) \vee \cdots \vee A(I+2) \vee A(I+1)$ ◆ IN CASE OF NO [OTHER PARTY SCREEN AREA]
$S \vee A(I) = S$

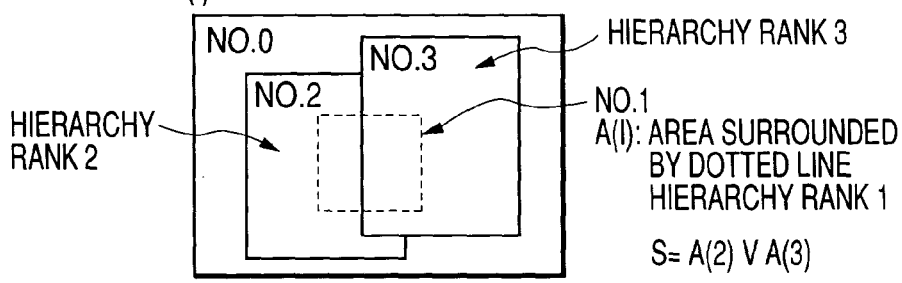

A(I): AREA SURROUNDED BY DOTTED LINE HIERARCHY RANK 1

$S = A(2) \vee A(3)$

◆ [OTHER PARTY SCREEN AREA] PARTIALLY DISPLAYED
$S \vee A(I) = S + A(I) - (S \wedge A(I))$

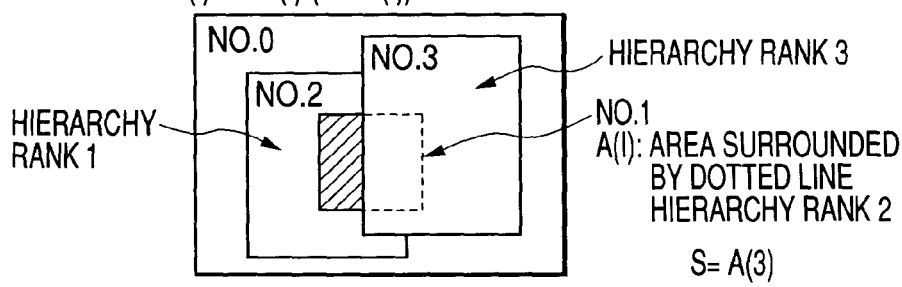

A(I): AREA SURROUNDED BY DOTTED LINE HIERARCHY RANK 2

$S = A(3)$

◆ [OTHER PARTY SCREEN AREA] COMPLETELY DISPLAYED
$S \vee A(I) = S + A(I)$

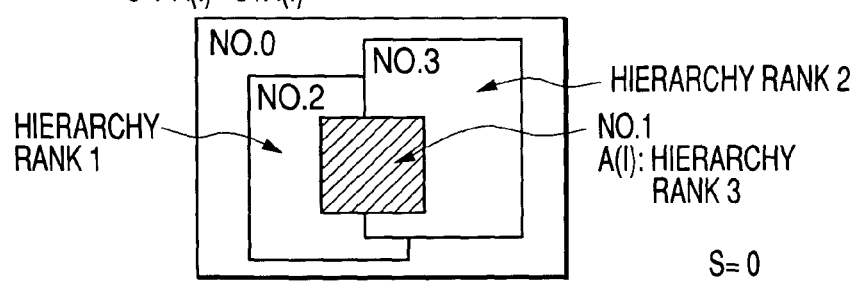

A(I): HIERARCHY RANK 3

$S = 0$

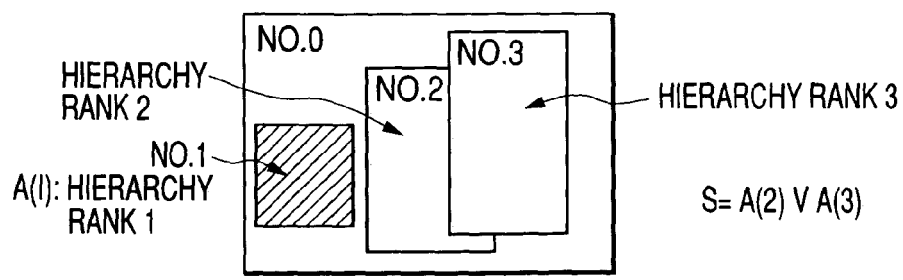

A(I): HIERARCHY RANK 1

$S = A(2) \vee A(3)$

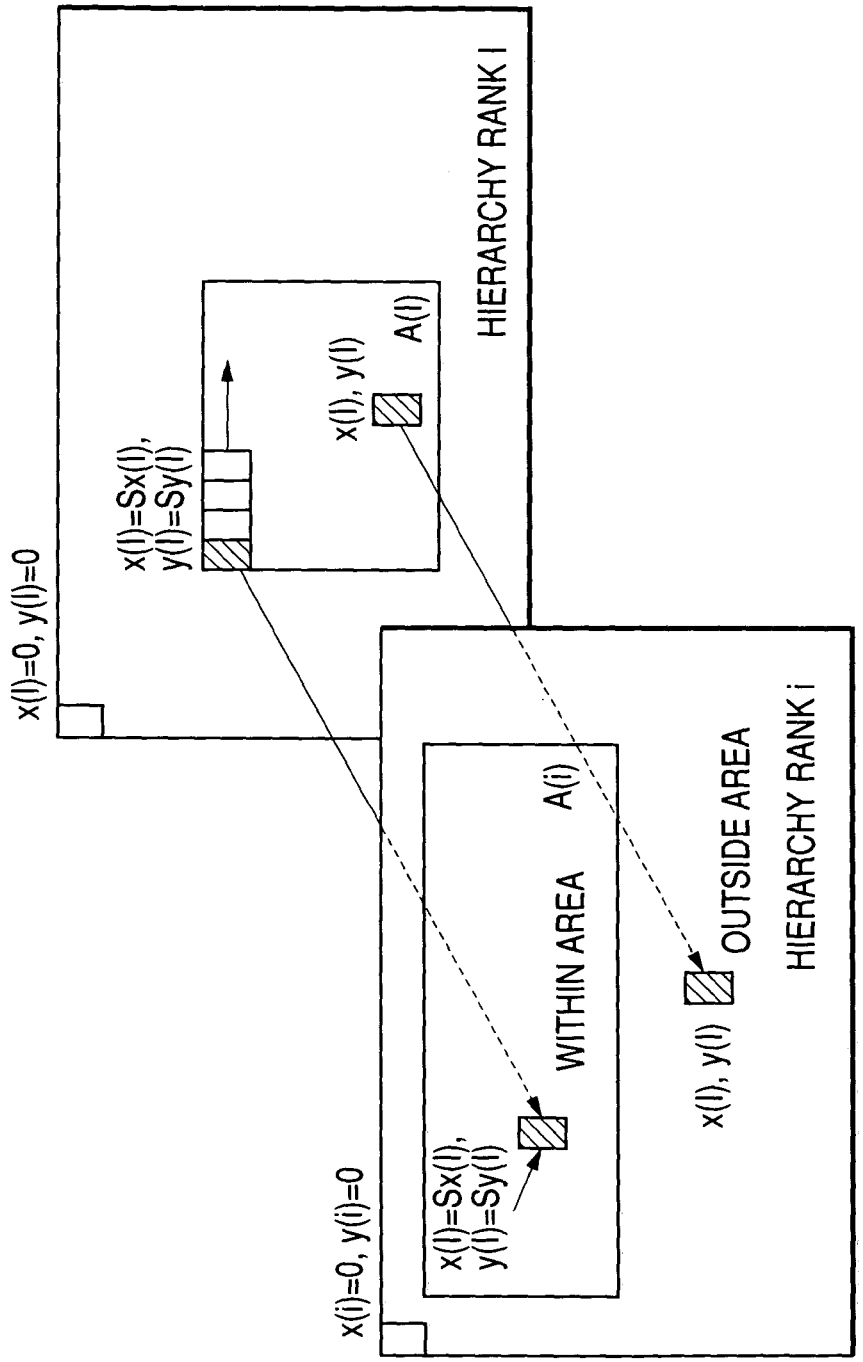

FIG. 15A

| OTHER PARTY SCREEN DISPLAY AREA (AREA WHICH IS ACTUALLY VIEWED) | [CONTROL COMMAND] EXAMPLE |
|---|---|
| 100% | OPTIMUM MOVING IMAGE TRANSMISSION |
| ↓ (DECREASE) | TRANSMIT MOVING IMAGE TO WHICH DATA REDUCTION PROCESSING IS APPLIED<br>• DROP DOWN FRAME RATE<br>• DROP DOWN IMAGE RESOLUTION<br>• HEIGHTEN IMAGE COMPRESSION RATE<br>(DROP DOWN IMAGE QUALITY) |
| 0% | STOP TRANSMISSION OF MOVING IMAGE (*) |

IT IS NOT NECESSARILY REQUIRED TO STOP TRANSMISSION OF MOVING IMAGE AT 0%. IN ADDITION, TRANSMISSION OF MOVING IMAGE MAY BE STOPPED EVEN IF IT IS NOT REACHED TO 0%.

FIG. 15B

EXAMPLE: IN CASE THAT 4 STAGES OF REFERENCE RANGE OF STATE CHANGE ARE DISPOSED

| OTHER PARTY SCREEN DISPLAY AREA (AREA WHICH IS ACTUALLY VIEWED) | [CONTROL COMMAND] EXAMPLE |
|---|---|
| 100 TO 80% | OPTIMUM MOVING IMAGE TRANSMISSION |
| 80 TO 50% | FRAME RATE IS DROPPED DOWN TO 50% OF THAT AT OPTIMUM TIME |
| 50 TO 20% | FRAME RATE IS DROPPED DOWN TO 20% OF THAT AT OPTIMUM TIME |
| 20 TO 0% | MOVING IMAGE TRANSMISSION STOP |

COMMUNICATION APPARATUS

BACKGROUND OF THE INVENTION

1. Field of the Invention

The present invention relates to a communication apparatus, a communication system, a communication program and a recording medium in which the communication program is recorded, which are utilized in a system such as a TV conference system.

2. Description of the Related Art

In a TV conference system in which a plurality of locations are connected by a communication apparatus to carry out a TV conference, in accordance with a data accumulation amount of a data buffer which is disposed in the communication apparatus, and CPU usage rate, generally carried out is a so-called flow control in which a transmission stop signal is transmitted to a communication apparatus which becomes a transmission source of data, and a data circulation amount is controlled. One example of the above system is disclosed in JP-A-7-284078. According to the flow control, since unnecessary data transfer is not carried out during a period of control, reduction of data transmission quantity, and load reduction of a communication apparatus, which comes up with it, can be provided.

In a conventional TV conference system, moving image data such as images of conference participants is transmitted from all locations to be connected. However, there are few cases that images of all locations are normally displayed in the same state, on a screen of an image display apparatus (i.e., monitor) of a communication apparatus, and for example, reception of moving image data from such a location that an image is not displayed became unnecessary data reception.

Herein, a relation between reception of moving image data and display on a monitor screen in a conventional TV conference system will be concretely described. FIG. 1 is a view which showed a display example of a monitor screen at an arbitrary location of the conventional TV conference system. In this TV conference system, it is designed in such a manner that, in a TV conference of three locations of A, B, C, when a user of a communication apparatus selects, it is possible to display images of conference participants at any one location out of two locations to be connected. In addition, it is also possible to display images of two locations in turns with a predetermined time interval, by a program of the TV conference system.

However, a communication apparatus at a location C always displays only an image of any one location, while it receives moving image data from both locations A, B. That is, reception of moving image data from the location B when images of conference participants of the location A is displayed, and reception of moving image data from the location A when images of conference participants of the location B is displayed, and so on, became unnecessary data transfer.

In addition, for example, there is such a case that another application software is activated during the TV conference, and other images than images of conference participants are displayed on a monitor screen. FIG. 2 is a view which shows a screen display example in case that word-processing software is activated during the TV conference. Since a window (display area) of the word-processing software is displayed on the foreground, a window of the TV conference system is almost completely covered up. Even in the suchlike reception of moving image data from both of the locations A, B became unnecessary data transfer.

As the number of connection locations is increased, this unnecessary data transfer is increased, and therefore, there is such a problem that lowering of transfer efficiency, delay and image quality deterioration due to excess of processing capacity of a communication apparatus, communication delay due to repetition of collisions, and so on become prominent.

SUMMARY OF THE INVENTION

One of the objects of the invention is to provide a communication apparatus in which problems are solved, the problems such as lowering of transfer efficiency, delay and image quality deterioration due to excess of processing capacity of a communication apparatus, communication delay due to repetition of collisions.

According to a first aspect of the invention, there is provided a communication apparatus including: a display state detecting unit that detects a display state of an image to be displayed on the basis of a received moving image data; and a control information transmitting unit that transmits, to a transmission source of the moving image data, control information regarding transmission of the image data, in accordance with the display state.

According to a second aspect of the invention, there is provided a communication apparatus including: a moving image data transmitting unit that transmits moving image data to a transmission destination; a control signal receiving unit that receives, from the transmission destination, control information including an instruction regarding transmission stop or transmission restart of the moving image data, or an instruction for adjusting a moving image characteristic of moving image data to be transmitted; and a moving image characteristic converting unit that stops and restarts transmission of the moving image data, and converts the moving image characteristic of the moving image data to be transmitted.

According to a third aspect of the invention, there is provided a communication method including: transmitting moving image data to a transmission destination; detecting a display state of an image to be displayed on the basis of the moving image data being received; transmitting control information to a transmission source in accordance with the display state; receiving the control information from the transmission destination; and stopping and restarting transmission of the moving image data, and converting a moving image characteristic of the moving image data to be transmitted, on the basis of the control information.

According to a fourth aspect of the invention, there is provided a communication program product for causing a computer system to execute procedures including: transmitting moving image data to a transmission destination; detecting a display state of an image to be displayed on the basis of the moving image data being received; transmitting control information to a transmission source in accordance with the display state; means for receiving the control information from the transmission destination; and stopping and restarting transmission of the moving image data, and converting a moving image characteristic of the moving image data to be transmitted, on the basis of the control information.

BRIEF DESCRIPTION OF THE DRAWINGS

These and other objects and advantages of the present invention will become more fully apparent from the following detailed description taken with the accompanying drawings, in which:

FIG. 13 is a view which conceptually explains judgment of whether an image to be targeted is displayed or not, among a plurality of images on a screen;

FIG. 14 is a view which conceptually explains judgment of whether, as to two images to be compared, they are displayed or not;

FIGS. 15A and 15B are tables which show a corresponding example of a rate of a change of a display area and a control command;

DETAILED DESCRIPTION OF THE PREFERRED EMBODIMENTS

Figure 1:
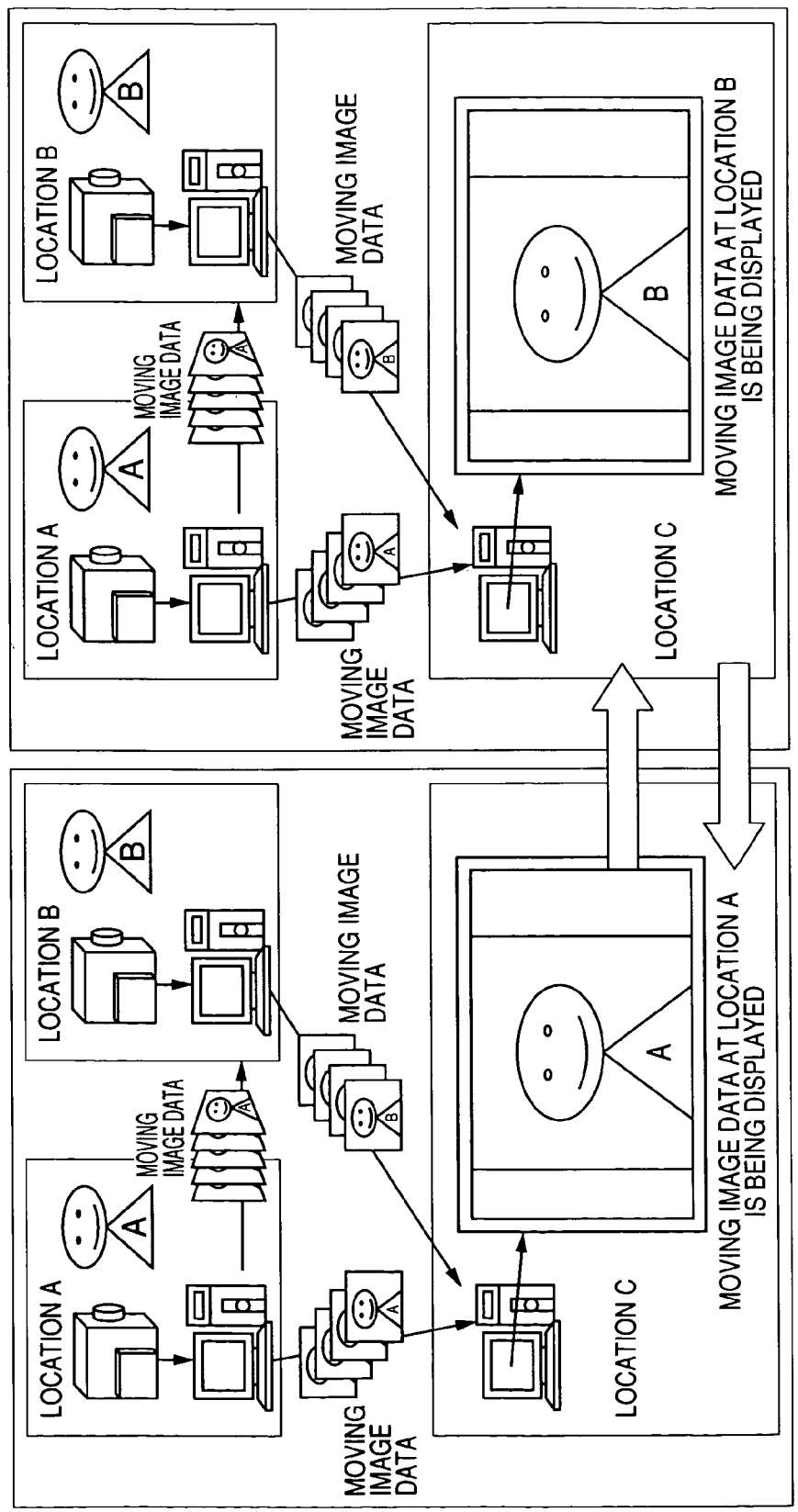
FIG. 1 is a view which shows a display example of a monitor screen at an arbitrary location of a conventional TV conference system.
Figure 2:
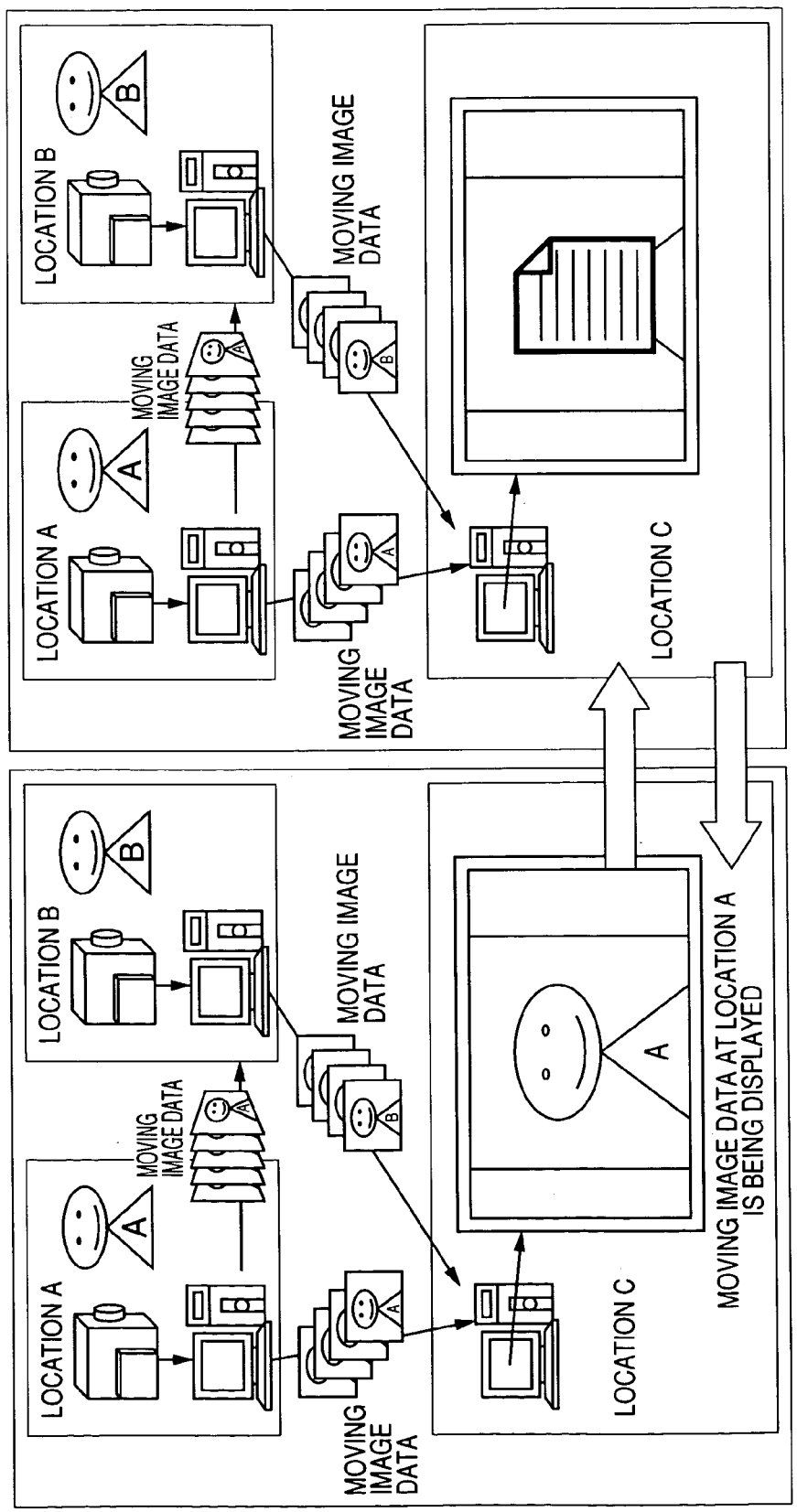
FIG. 2 is a view which shows a screen display example in case that word-processing software is activated during the TV conference.

Hereinafter, a communication terminal of the invention will be described in detail with reference to drawings. Parts the same as those in the drawings are denoted by the same reference numerals, so that repetitive description of the parts will be omitted.

First Embodiment

A communication apparatus according to a first embodiment of the invention will be described. The communication apparatus according to the first embodiment, on the occasion of receiving moving image data from another communication apparatus to be connected, to display an image on a monitor, detects a change of a size of a display area, and carries out such a reception control operation that a control command, which relates to transmission of moving image data, such as transmission stop of moving image data and modification of a moving image characteristic of moving image data, is transmitted to a communication apparatus which becomes a transmission source of moving image data.

Figure 3:
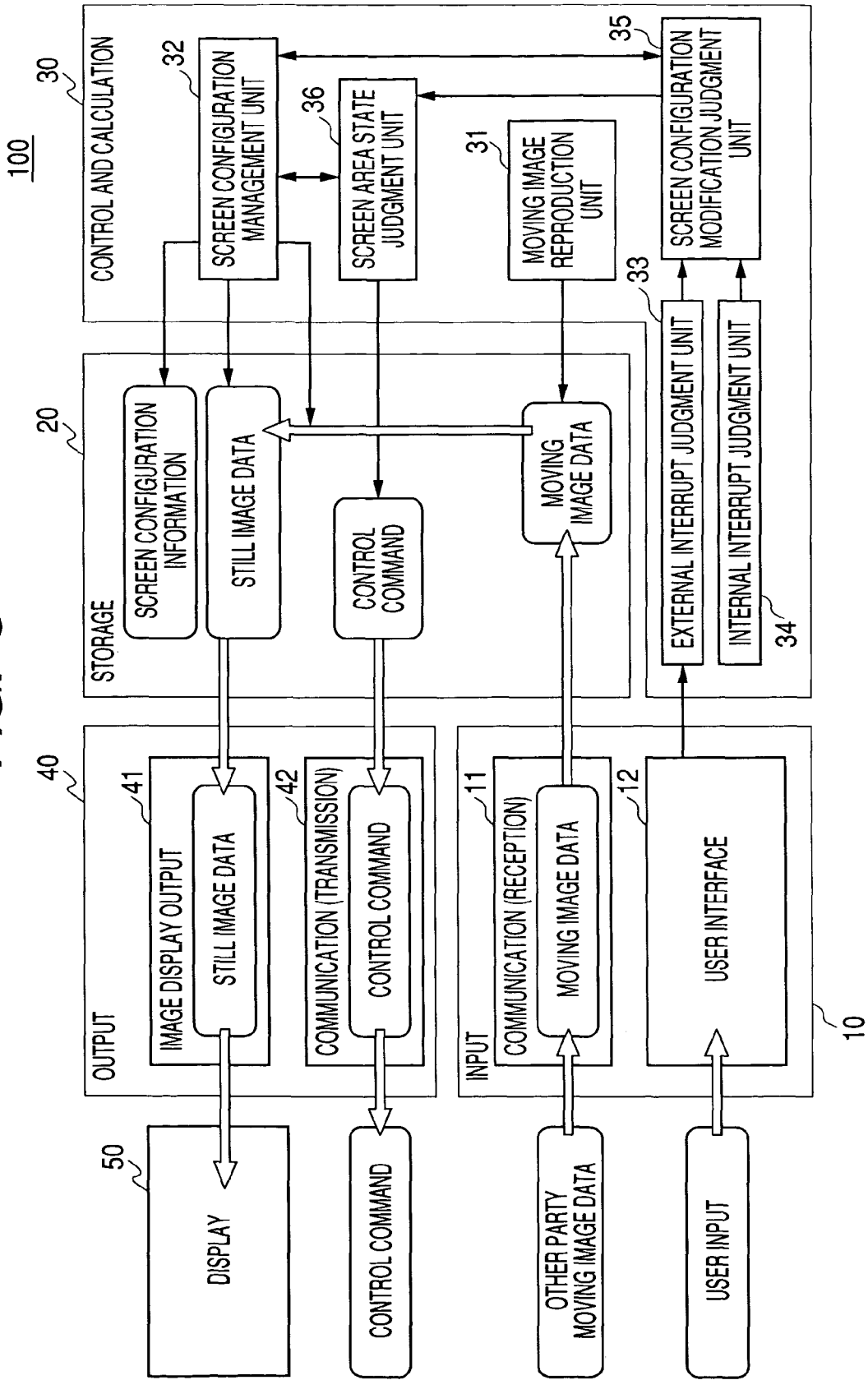
FIG. 3 is a view which shows a schematic configuration of a communication terminal in a first embodiment of the invention.

FIG. 3 is a view which shows a schematic configuration of the communication apparatus. A communication apparatus 100 includes: an input block 10 which carries out reception of moving image data and an operation input; a memory 20 for storing data such as the received moving image data, screen configuration information of a display screen, and a control command; a control and calculation block 30 which carries out reproduction of moving image data, and judgment of presence or absence of change of a display area of an image; an output block 40 which carries out output of still image data to be used for screen display; and transmission of a control command; and a monitor 50 for carrying out screen display.

The input block 10 includes an image data receiving device 11 which receives moving image data through a communication line, and a user interface device 12 which includes a keyboard.

The control and calculation block 30 includes a moving image reproduction unit 31, a screen configuration management unit 32, an external interrupt judgment unit 33, an internal interrupt judgment unit 34, a screen configuration modification judgment unit 35, and a screen area state judgment 36. Each of these units is realized by a program which is stored in CPU (Central Processing Unit) and HDD (Hard Disk Drive) (each is omitted to be shown in the figure) of a personal computer etc. In addition, a TV conference, which is carried out in the communication apparatus 100, is also realized by carrying out a TV conference system program, which is stored in HDD, by CPU, in this control and calculation block 30.

The moving image reproduction unit 31 reproduces moving image data which is received through the image data receiving device 11. By the reproducing operation, still image data is provided to the memory 20. The screen configuration management unit 32 manages a configuration of a display area of an image which is displayed on the monitor 50, i.e., a screen configuration.

For example, in case that word-processing software is activated in addition to the TV conference system, a screen configuration, which is based upon an anteroposterior relation and an overlapping order of both windows, is outputted as screen configuration information. The external interrupt judgment unit 33 monitors an input from the user interface device 12, and detects an external interrupt from a user of the communication apparatus 100. The internal interrupt judgment unit 34 detects an internal interrupt of a TV conference system program. Details of the external interrupt and the internal interrupt will be described later.

The screen configuration modification judgment unit 35 judges whether or not modification occurred in the screen configuration by interrupt processing. The screen area state judgment unit 36 judges whether there is a change or not in a display area of an image (window) of a TV conference system, on the basis of the screen configuration information. In case that there is a change, a control command, which relates to transmission of moving image data, is generated and outputted. A detail of the control command will be described later.

The output block 40 includes an image display output device 41 which outputs still image data so that it can be displayed on the monitor 50, and a control command transmission device 42 which transmits a control command, which is outputted from the screen area state judgment unit 36, to a communication apparatus which becomes a transmission source of moving image data.

Figure 4:
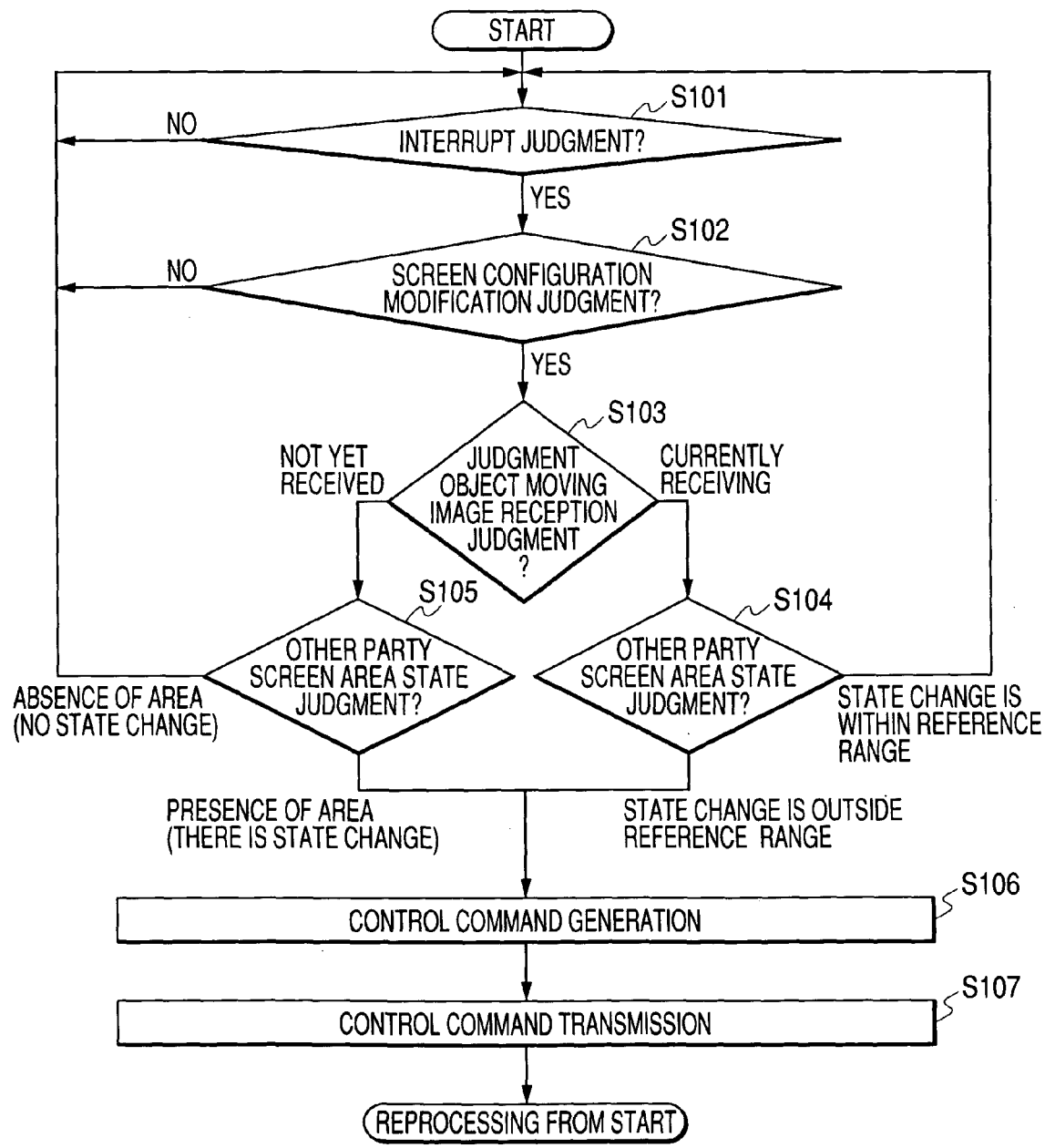
FIG. 4 is a flow chart which shows procedures of a moving image data reception control operation, of the communication apparatus in the first embodiment of the invention.

Next, a moving image data receiving control operation of the communication apparatus 100 of the above-described configuration will be described. FIG. 4 is a flow chart which shows a procedure of a moving image data receiving control operation.

In the communication apparatus 100, in a normal state, moving image data, which is received from a communication apparatus to which the image data receiving device 11 is connected, is reproduced by the moving image reproduction unit 31, and still image data is outputted from the image display output device 41 to the monitor 50, and display of an image is carried out.

On this occasion, the external interrupt judgment unit 33 and the internal interrupt judgment unit 34 carry out monitoring of interrupt processing (Step S101).

Here, external interrupt processing and internal interrupt processing will be described concretely.

As the external interrupt processing, as one example, there is processing which is carried out in preference to normal processing of a TV conference system, by keyboard input etc. of a user of the communication apparatus 100. As such an interrupt that a display area of an image which is displayed on a window of a TV conference is changed, for example, it is a resize operation of a window, an activation operation of another application, switching and replacing of displays, and so on.

Figure 5:
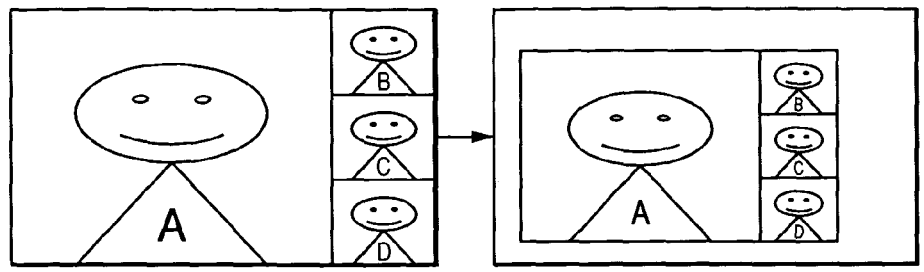
FIG. 5 is a view which shows such an example that a display area of an image is changed by an interrupt.
Figure 6:
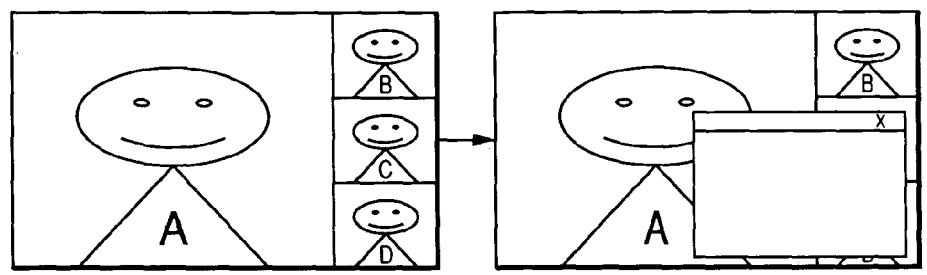
FIG. 6 is a view which shows such an example that a display area of an image is changed by an interrupt.

FIGS. 5 and 6 are views which show such an example that a display area of an image is changed by an external interrupt. Each of these figures is a screen display example of a TV conference system which has a window for displaying images of conference participants.

FIG. 5 shows such an example that a display area is reduced since a user manually shrank a window of a TV conference. FIG. 6 shows such an example that, since a window of another application, which is newly activated, is displayed on the foreground, a window of a TV conference is partially covered up, and a display area is reduced. There is also such a case that an entire window is covered up.

As the internal interrupt processing, as one example, there is interrupt processing which is carried out by a TV conference system program of the communication apparatus 100. As such an interrupt that a display area of an image, which is displayed on a window of a TV conference system, is changed, for example, there is a program for automatically switching images of conference participants of plural connection destinations (communication apparatuses) with a timer, and a program for displaying an image of a new conference participants in preference with a predetermined period of time, and so on.

FIGS. 7-10 are views which show such an example that a display area of an image is changed by an internal interrupt. Each of these figures is a screen display example of a TV conference system which has a window for displaying images of conference participants.

Figure 7:
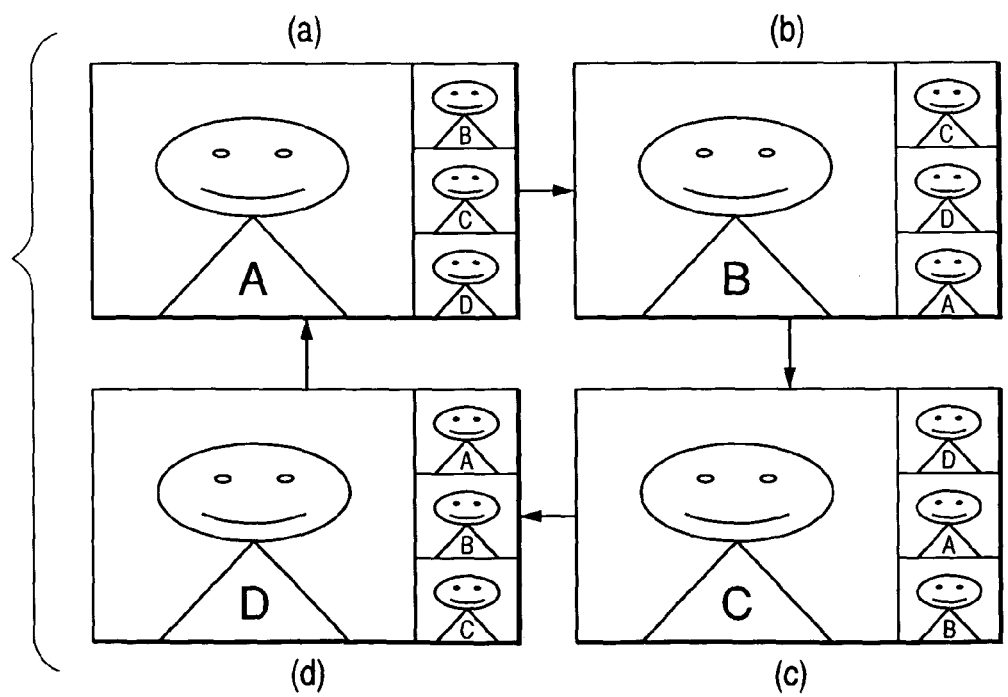
FIG. 7 is a view which shows such an example that a display area of an image is changed by an interrupt.

FIG. 7 shows such an example that a display area is increased and decreased, since a main image is switched at a predetermined time interval, by timer processing of a TV conference system. For example, an image of a conference participants at a location A is displayed on a main area and the display area is increased as shown as (a) in FIG. 7, but as shown as (b), (c) and (d), the display area is decreased.

Figure 8:
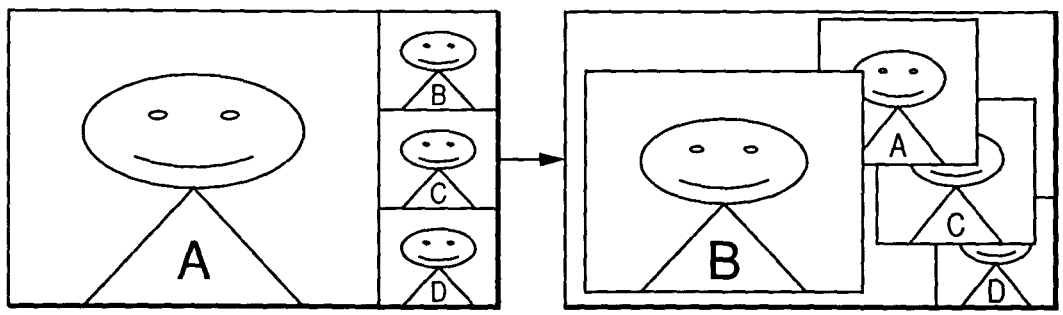
FIG. 8 is a view which shows such an example that a display area of an image is changed by an interrupt.

In addition, FIG. 8 shows such an example that, by priority order processing of a TV conference system, in accordance with display frequency of an image, a priority order of a size and a display position of an image is determined, and a display area is increased and decreased.

An image of a conference participant at a location B, which is of high display frequency, during the conference, is displayed on the foreground, and a display area is increased, but an image of a conference participant at the location A, which is of low display frequency, is hid out on a back surface, and a display area is decreased.

Figure 9:
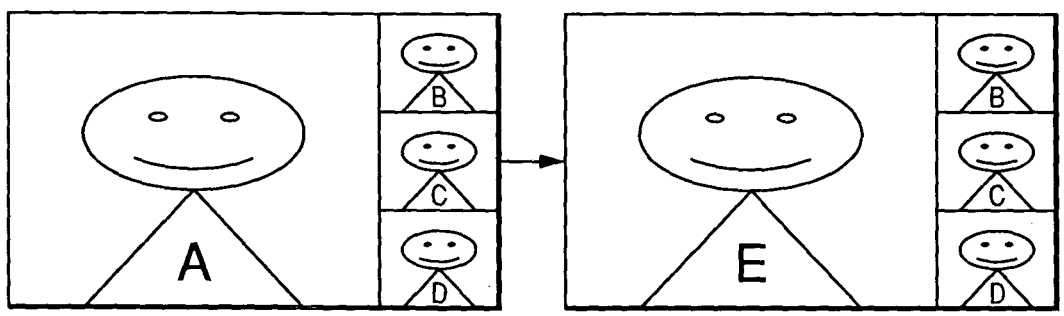
FIG. 9 is a view which shows such an example that a display area of an image is changed by an interrupt.

FIG. 9 shows such an example that a display area is increased and decreased, since a TV conference system detects a communication apparatus which newly participated in the conference, and switched display of images. For example, a display area of an image of a conference participant at a location E, which newly participates, is increased (from 0), but a display area of an image at the location A, which is displayed on a main area until that moment, disappears. On one hand, a display area of an image at the location B does not change.

Figure 10:
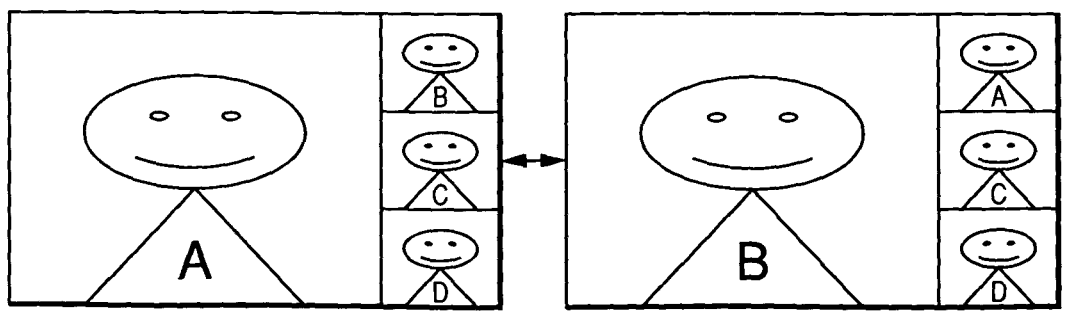
FIG. 10 is a view which shows such an example that a display area of an image is changed by an interrupt.

FIG. 10 shows such an example that a display area is increased and decreased, since a TV conference system detected a speaker or a communication apparatus which has a right to speak, to have changed display of an image. For example, when a right to speak is moved from the location A to the location B, a display area of an image of a conference participant at the location A, which is displayed in a main area until that moment, is decreased. On one hand, a display area of an image at the location B is decreased. When a right to speak is moved again to the location A, a display area is changed inversely.

Referring back to FIG. 4, when interrupt processing takes place, the external interrupt judgment unit 33 and the internal interrupt judgment unit 34 detect the interrupt processing, and gives notice to the screen configuration modification judgment unit 35. The screen configuration modification judgment unit 35 judges whether a screen configuration of a monitor screen is changed or not due to the interrupt processing (step S102). In case that a screen configuration does not change even if the interrupt processing takes place (i.e., in case that it is not interrupt processing which has an influence on display of a monitor screen), it is returned to the step S101, and monitoring of interrupt processing is repeated again.

On one hand, in case that there is a change in a screen configuration, the screen area state judgment unit 36 judges whether there is a change of a display are or not, as to an image to be targeted (moving image data). On that occasion, firstly, presence or absence of reception of moving image data to be targeted is judged (step S103), and in case that it is being received, a change of a display area is judged in a step S104, and in case that it is not received, a change of a display area is judged in a step S105. In each case, in case that there is a change in a display area, a control command is generated in the screen area state judgment unit 36 (step S106), and this is transmitted from the control command transmission device 42 to a communication apparatus which becomes a transmission source of moving image data (step S107). Since the control command is an instruction for stopping transmission of moving image data, and changing a frame rate and resolution, reduced is data transmission quantity from the communication apparatus which becomes a transmission source.

The screen area state judgment unit 36 judges a change of a display area by comparing screen configuration information that the screen configuration management unit 32 outputs, before and after the interrupt processing, but this detail will be described later. In addition, it generates control commands which differ according to a degree of the change of the display area, but this will be also described in detail later. The procedures from the step S103 up to the step S107 are carried out as to all images to be targeted (moving image data). In short, the procedures are repeated by the same number of times as the number of communication apparatuses to be connected, and control commands, which are generated, are transmitted to communication apparatuses to be targeted, respectively.

Explaining procedures from the step S103 up to the step S107 by a concrete example, in case that a change of a screen configuration shown in FIG. 6 is generated in a monitor screen of an arbitrary communication apparatus, as to moving image data from the location A, reception is firstly confirmed (step S103) Since it is in reception, it is advanced to the step S104, and a change of a display area is judged.

The screen area state judgment unit 36 takes hold of such a fact that a display area of an image at the location A is decreased by another window which is displayed on the foreground, and generates a control command (step S106), and transmits to a communication apparatus at the location A (step S107).

As to moving image data from the location B, reception is firstly confirmed (step S103). Since it is in reception, it is advanced to the step S104, and a change of a display area is judged. The screen area state judgment unit 36 takes hold of such a fact that a display area of an image at the location B does not change, and without generating a control command, it is returned to a step S101.

In addition, as to moving image data from a location C, reception is firstly confirmed (step S103). Since it is in reception, it is advanced to the step S104, and a change of a display area is judged. The screen area state judgment unit 36 takes hold of such a fact that a display area of an image at the location C disappeared by another window which is displayed on the foreground, and generates a control command (step S106), and transmits to a communication apparatus at the location C (step S107). Further, as to a location D, judgment of a change of a display area is carried out by the same procedures.

In addition, explaining procedures from the step S103 up to the step S107 by another example, in case that a change of a display area shown in FIG. 9 is generated on a screen of an arbitrary communication apparatus, as to moving image data from the location A, reception is firstly confirmed (step S103). Since it is in reception, it is advanced to the step S104, and a change of a display area is judged.

The screen area state judgment unit 36 takes hold of such a fact that a display area of an image at the location A is decreased, and generates a control command (step S106), and transmits to a communication apparatus at the location A (step S107). Also as to the locations B, C, D, judgment is carried out in the same manner.

As to moving image data from a location E, reception is firstly confirmed (step S103). Since moving image data from the location E has not yet been received at such a time location that interrupt processing took place, it is advanced to the step S105, and a change of a display area is judged.

The screen area state judgment unit 36 takes hold of such a fact that a display area of an image at the location E is newly generated, and generates a control command for requesting transmission start of moving image data (step S106), and transmits to a communication apparatus at the location E (step S107).

There is also such a case that a screen configuration does not change even if interrupt processing is generated, and there is also such a case that a change of a display area of a window of a TV conference is not generated even if a screen configuration is changed. In the suchlike case, generation of a control command is not carried out.

Hereinafter, judgment processing of a change of a display area will be described in detail.

Figure 11:
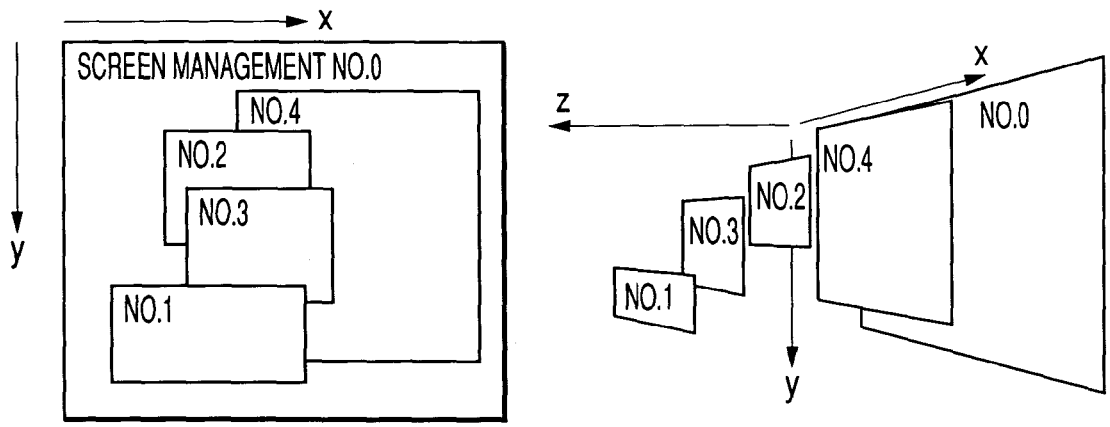
FIG. 11 is a view which explains a concept of a screen configuration on a monitor screen.

FIG. 11 is a view which explains a concept of a screen configuration on a monitor screen. The screen configuration management unit 32 takes hold of screen configurations such as whether an image is displayed or not, how much an actual display area becomes against a size of an image, as to all images to be displayed on a monitor screen. Therefore, if screen configuration information is compared before and after interrupt processing, it is possible to judge a change of a display area as to each image. The judgment is carried out by the screen area state judgment unit 36.

Screen configuration information, which is used for judgment of a change of a display area, is composed of 5 pieces of screen management number, screen hierarchy rank, screen starting coordinate, screen area size, presence or absence of a transmission pixel. Here, the screen hierarchy rank is an overlapping order in a Z axis direction on the occasion of managing (layer-managing) a two-dimensional image with a XY coordinate by a 3-dimension of a XYZ coordinate, for the purpose of managing a plurality of images. As shown in FIG. 11, the larger a hierarchy rank is, it represents that an image is close to the foreground.

Figure 12A:
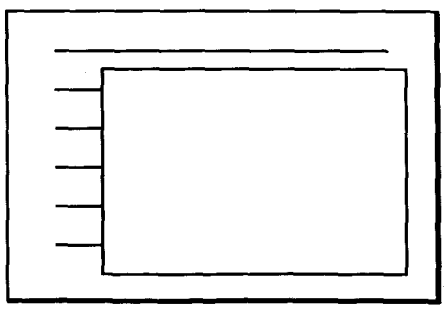
FIGS. 12A and 12B are views which show a difference of displays due to presence or absence of a transmission pixel.
Figure 12B:
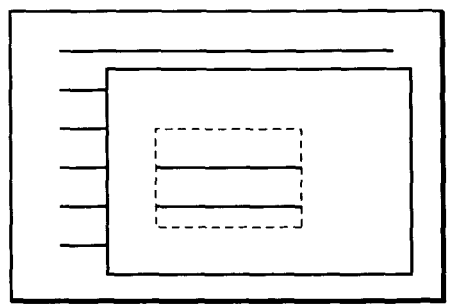

In addition, the presence or absence of a transmission pixel is information of whether or not there is a pixel for showing display of a lower rank hierarchy than itself, on the occasion of screen display processing. FIGS. 12A and 12B are views which shows a difference of displays due to presence or absence of the transmission pixel. In screen display of FIG. 12A, the transmission pixel is not included in an image on the foreground, but in screen display of FIG. 12B, the transmission pixel is included in an image on the foreground.

Here, as to N pieces of images from screen management numbers No. 0 to No. N−1, assuming that those display areas are set from A(0) to A(N−1) and a screen management number of an image to be targeted (the other end screen area) is set to No. I, it is possible to judge whether an image of No. I is displayed or not on still image data which is outputted to a monitor, by whether or not summation S of display areas of images which are located at upper hierarchy ranks than the image of No. I covers up a display area A(I) of No. I.

FIG. 13 is a view which conceptually explains judgment of whether an image to be targeted is displayed or not, among a plurality of images on a screen. As shown in the figure, in case of SvA(I)=S, an image of No. 1 is not displayed. In addition, in case of SvA(I)=S+A(I)−(SΛA(I)), the image of No. 1 is partially displayed. Further, in case of SvA(I)=S+A(I), the image of No. 1 is completely displayed.

Comparison judgment of SvA(I), it may be judged as to whether a coordinate of an image is located within or outside an area of an image with upper hierarchy, as to all pixels which configure A(I). Explaining concretely, assuming that a investigation target pixel of A(I) is (x(I), y(I)), an investigation target pixel of a display area A(I) with a start coordinate (Sx(I), Sy(I)), a width W(I), and a height H(I) is in a range of $Sx(I) \leq x(I) < Sx(I)+W(I)$ in a X direction, and $Sy(I) \leq y(I) < Sy(I)+H(I)$ in a Y direction.

It is investigated as to whether or not this is $Sx(i) < x(I) < Sx(i)+W(i) \wedge Sy(i) \leq y(I) < Sy(i)+H(i)$ as to a upper hierarchy rank I<i<N. FIG. 14 is a view which conceptually explains judgment of whether it is displayed or not, as to two images to be compared, with respect to each pixel. By carrying out judgment with respect to each pixel, it is possible to quantitatively take hold of a display area of an image to be targeted. Therefore, by comparing this before and after interrupt processing, it is possible to quantitatively judge a change of a display area of an image.

Next, a corresponding relation of a degree of a change of a display area of an image and a control command will be concretely described.

For example, in case that a change of a screen configuration shown in FIG. 6 is generated on a monitor-screen of an arbitrary communication apparatus, a display area of an image of a conference participant at the location A is decreased to approximately 60% of that prior to a change. On that account, since it is conceivable that there is no necessity to receive moving image data with the same quality level as that prior to a change, by having moving image data, in which a frame rate and resolution are dropped down, transmitted, it is possible to realize reduction of data transmission quantity.

On one hand, since images at the location C are all eliminated (i.e., down to 0%), it had better to stop transmission of moving image data in this case. In this manner, if it is designed that a control command is properly changed in accordance with a degree of a change of a display area of an image, it is possible to realize appropriate reduction of data transmission quantity. FIGS. 15A and 15B are tables which shows a corresponding example of a rate of a change of a display area and a control command.

As shown in FIG. 15A, it may be fine to make a control command, which is in proportion to a rate of a change of a display area, and as shown in FIG. 15B, it may also be fine to make a control command, in which a range is set up for a change of a display area.

It is preferable to store the corresponding relations as shown in the figures in an area in the memory 20 to which the screen area state judgment unit 36 can make reference, as a reference table.

Figure 16:
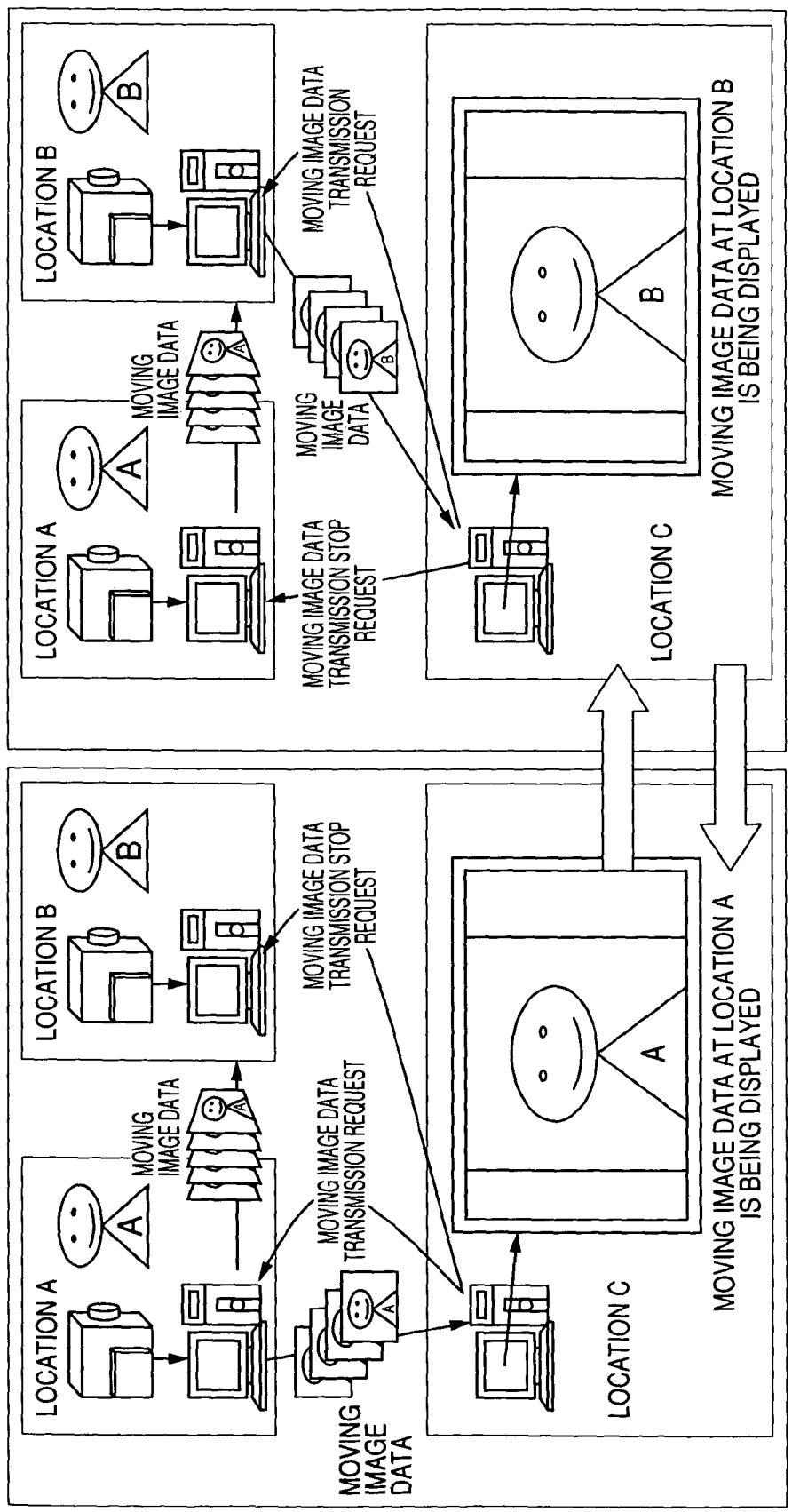
FIG. 16 is a view which conceptually shows a moving image data reception control operation example, of the communication terminal in the first embodiment of the invention.
Figure 17:
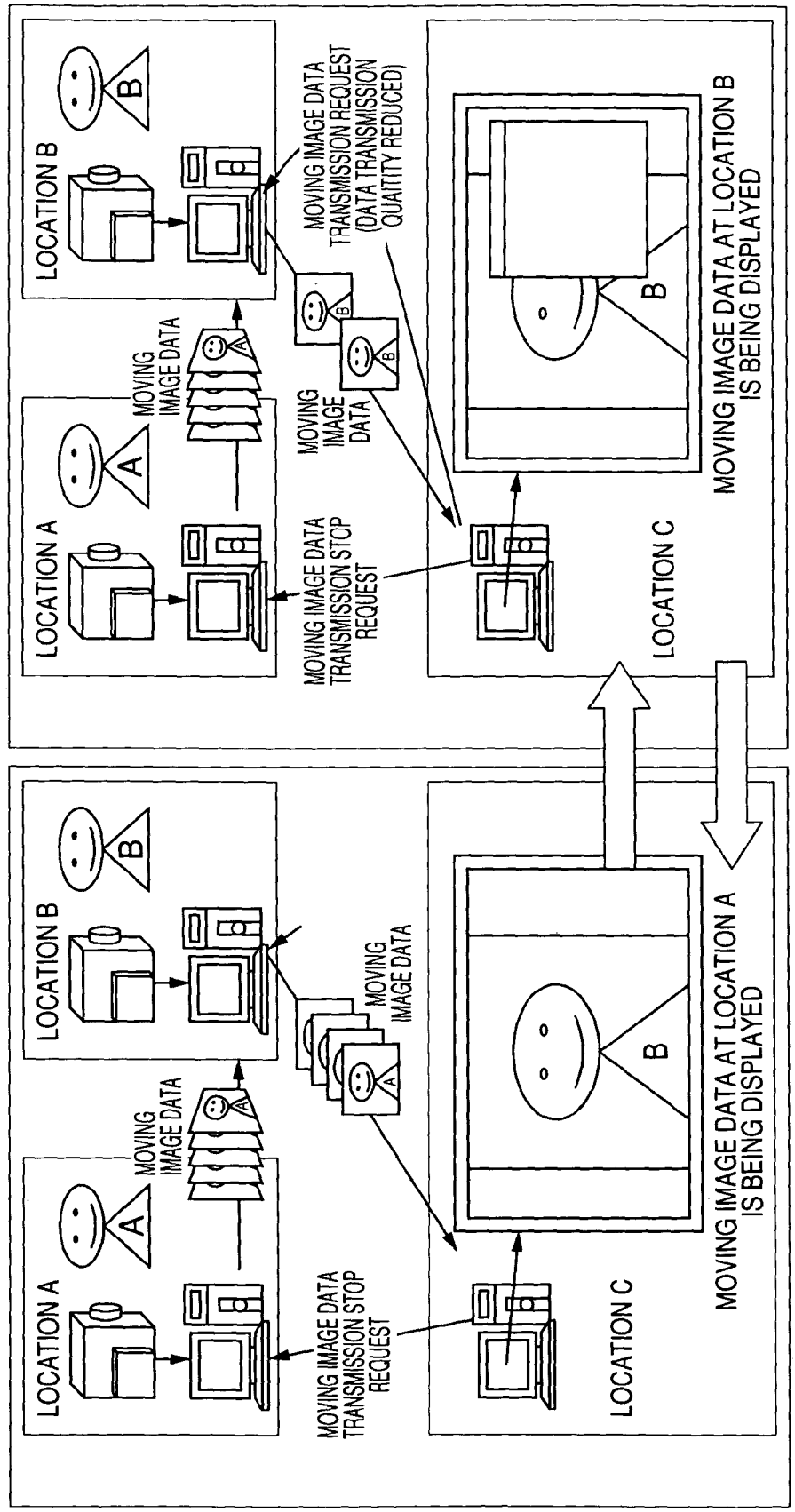
FIG. 17 is a view which conceptually shows a moving image data reception control operation example, of the communication terminal in the first embodiment of the invention.

As above, since the communication apparatus 100 does not carry out unnecessary data reception in reception of moving image data from another communication apparatus to be connected, data transmission quantity is reduced. FIGS. 16 and 17 are views which conceptually show moving image data reception control operation examples of the above-described communication apparatus 100. In FIG. 16, reception of unnecessary moving image data is stopped. Screen display of a TV conference system is switched, and a communication apparatus, which is transmitting moving image data of an image stopped to be displayed, stops data transmission.

In addition, in FIG. 17, a data amount of moving image data to be received is reduced. Since a display area of a screen of a TV conference system is decreased, a communication apparatus, which is transmitting moving image data of an image whose display area is decreased, transmits data in which a frame rate and resolution are made to be lowered.

In the meantime, for example, in case that, in FIG. 6, another window which is covering up a window of a TV conference system is closed, and in FIG. 7, a screen, which is located in a sub area, is displayed in a main area, control commands for instructing transmission restart of moving image data which is stopped to be transmitted, and restoration of a frame rate and resolution which had been lowered are generated, and transmitted to a communication apparatus to be connected.

In the moving image data reception control operation as above, for taking hold of a screen configuration which is carried out by the screen configuration management unit 32, may be utilized an equivalent function, such as an inter-application communication function which an operating system (OS) of a computer provides, and so on.

Second Embodiment

Next, a communication apparatus according to a second embodiment will be described. The communication apparatus in the second embodiment, on the occasion of transmitting moving image data which is shot by a camera, to another communication apparatus to be connected, receives a control command which is generated on the basis of a change of a display area of an image, from a communication apparatus which receives moving image data, and in accordance with the control command, carries out a transmission control operation such as transmission stop of moving image data and modification of a moving image characteristic of moving image data.

Figure 18:
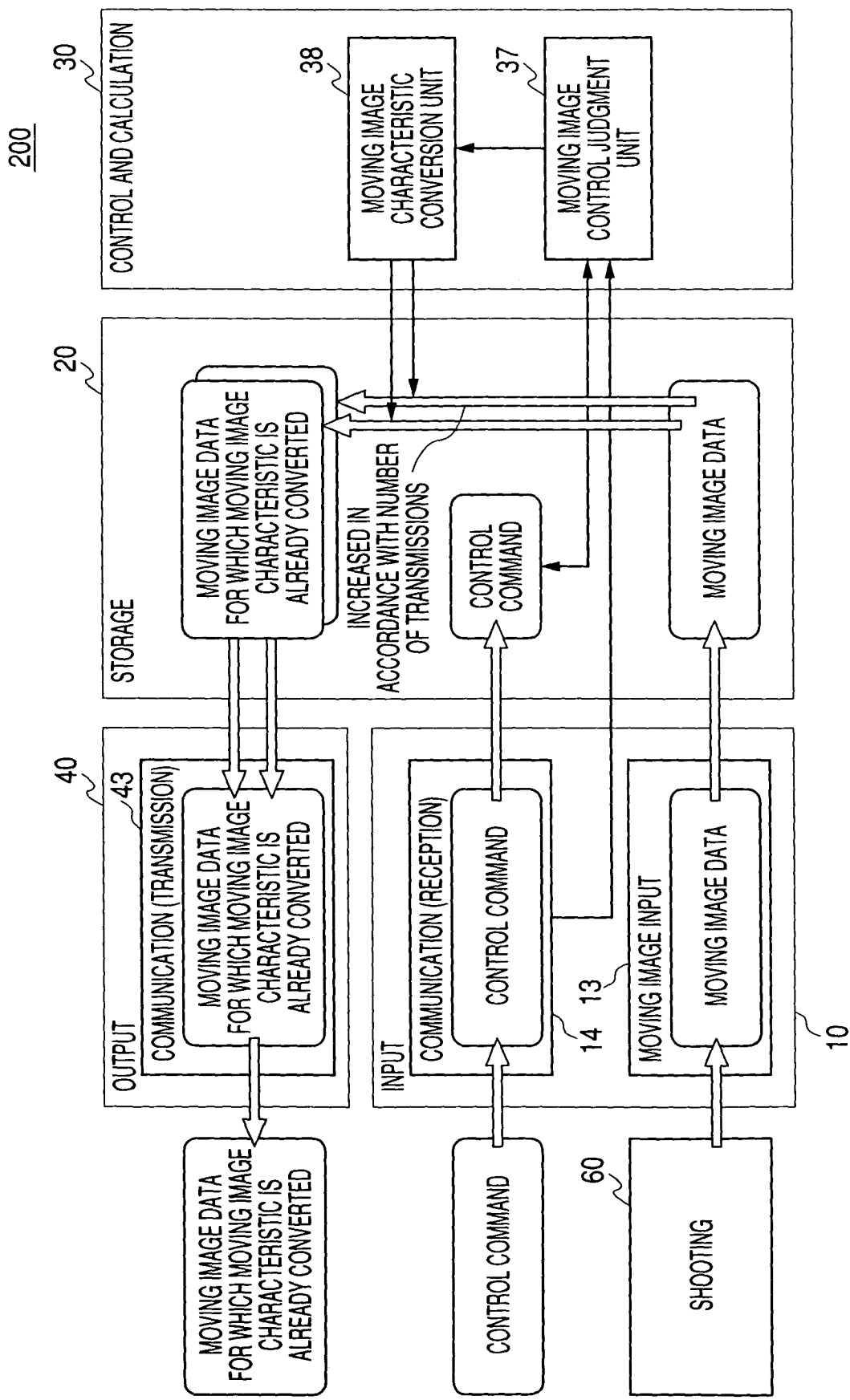
FIG. 18 is a view which shows a schematic configuration of a communication terminal in a second embodiment of the invention.

FIG. 18 is a view which shows a schematic configuration of a communication terminal of the second embodiment of the invention. A communication apparatus 200 includes a camera 60 which shoots an object of shooting to carry out generation of moving image data, an input block 10 which carries out acquisition of moving image data and reception of a control command, a memory 20 for storing the acquired moving image data, the received control command, moving image data after a moving image characteristic conversion, and so on, a control and calculation block 30 which carries out analysis of a control command, conversion processing of a moving image characteristic of moving image data, and so on, and an output block 40 which carries out transmission of moving image data after the moving image characteristic conversion.

Further, the input block 10 includes a moving image data acquiring device 13 which acquires moving image data shot by the camera 60, and a control command receiving device 14 which receives a control command through a communication line.

In addition, the control and calculation block 30 includes a moving image control judgment unit 37, and a moving image characteristic conversion unit 38. Each of these units is realized by a program which is stored in CPU (Central Processing Unit) and HDD (Hard Disk Drive) (each is omitted to be shown in the figure) of a personal computer etc. In addition, a TV conference, which is carried out in the communication apparatus 200, is also realized by carrying out a TV conference system program, which is stored in HDD, by CPU, in this control and calculation block 30.

The moving image control judgment unit 37 analyzes an instruction content of a control command which is received by the control command receiving device 14 and stored in the memory 20. The moving image characteristic conversion unit 38 converts a moving image characteristic of moving image data which is stored in the memory 20, on the basis of a content of the control command which is analyzed by the moving image control judgment unit 37. The conversion of a moving image characteristic is, concretely speaking, processing such as increase and decrease of a frame rate of moving image data, modification of resolution, increase and decrease of a compression rate.

The output block 40 includes an image data transmitting device 43 which transmits moving image data after a moving image characteristic conversion, to a communication apparatus to be connected.

Figure 19:
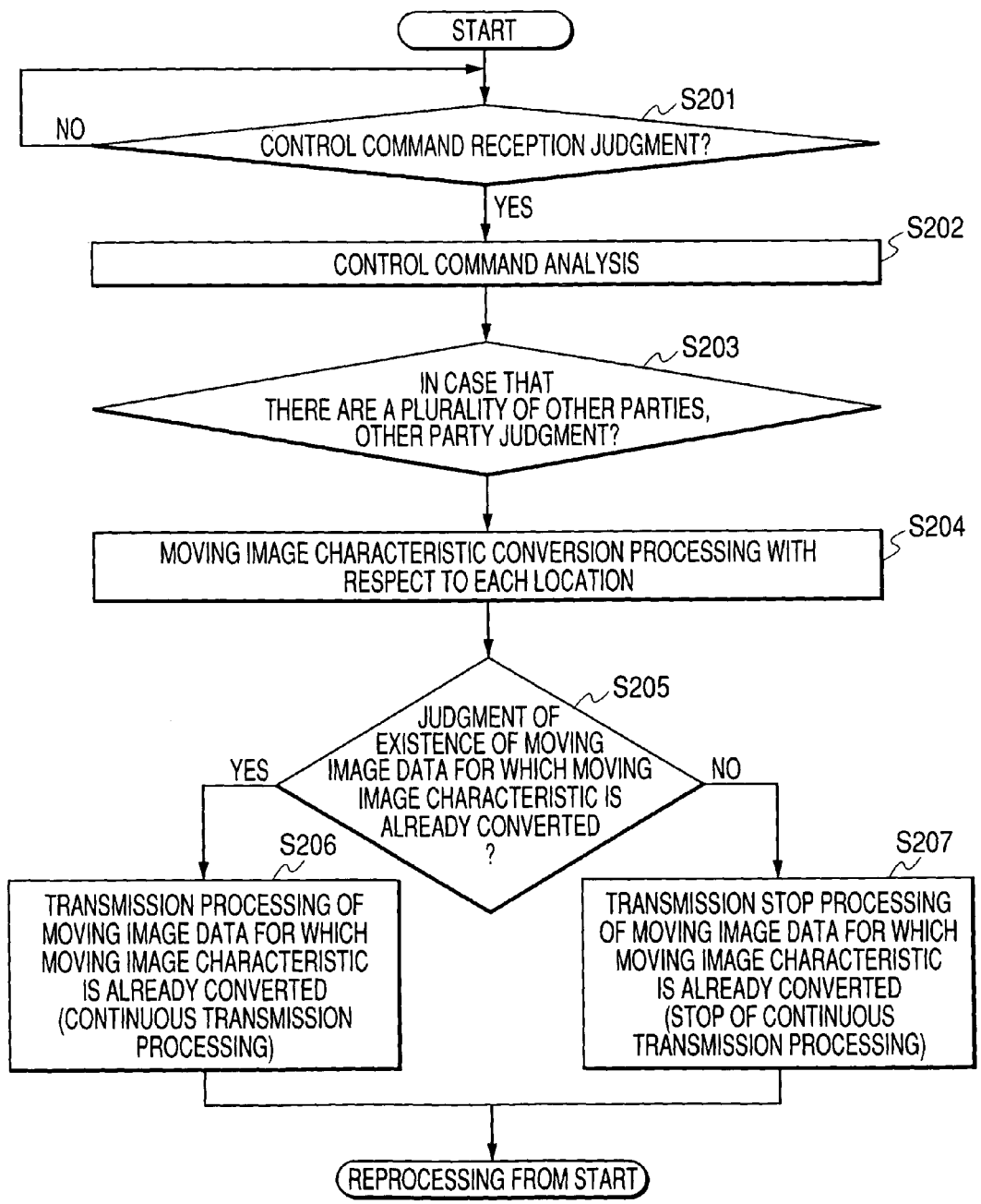
FIG. 19 is a flow chart which shows procedures of a moving image data transmission control operation, of the communication apparatus in the second embodiment of the invention.

Next, a moving image data transmission control operation of the communication apparatus 200 of the above-described configuration will be described. FIG. 19 is a flow chart which shows a procedure of the moving image data transmission control operation of the communication apparatus in the second embodiment of the invention.

The communication apparatus 200, in a normal state, transmits moving image data, which is shot by the camera 60, from the image data transmitting device 43 to a communication apparatus to be connected. On this occasion, the control command receiving device 14 monitors reception of a control command (step S201).

When a control command is received, the moving image control judgment unit 37 carries out analysis of the control command, and takes hold of a transmission source of the control command, a content such as a transmission request and a transmission stop request, and a modified content of a moving image characteristic of moving image data (step S202). In case of receiving control commands from a plurality of communication apparatuses, a communication apparatus, which is a transmission source of each control command, is specified, by analysis of control commands (step S203). And, the moving image characteristic conversion unit 38 generates moving image data for which conversion processing of a moving image characteristic is carried out with respect to each specified communication apparatus (step S204).

The image data transmitting device 43 judges, as to each of the specified communication apparatuses, whether or not there exists moving image data for which a moving image characteristic is already converted, for the relevant communication apparatus (step S205), and in case that there exists the moving image data for which a moving image characteristic is already converted, it is judged that a control command is of a transmission request, and the moving image data for which a moving image characteristic is already converted, is transmitted to the relevant communication apparatus (step S206). On one hand, in case that there exists no moving image data for which a moving image characteristic is already converted, it is judged that a control command is of a transmission stop request, and transmission of moving image data, which has been carried out until this moment, is stopped (step S207).

Explaining procedures from the step S204 up to the step S207 by a concrete example, for example, in case that a change of a screen configuration as shown in FIG. 6 is generated, on a monitor screen of a communication apparatus at a location B, since a display area of an image at a location A is decreased, a control command for requesting moving image data in which a frame rate is made to be lowered is transmitted from the location B to the location A, and the communication apparatus 200 at the location A transmits the moving image data with the lowered frame rate, to the location B.

In addition, in case that a change of a screen configuration as shown in FIG. 8 is generated, on a monitor screen of a communication apparatus at a location C, since a display area of an image at the location A is decreased also here, a control command for requesting moving image data in which resolution is made to be lowered is transmitted from the location C to the location A, and the communication apparatus 200 at the location A transmits the moving image data with lowered resolution, to the location C.

Further, in case that a change of a screen configuration as shown in FIG. 9 is generated, on a monitor screen of a communication apparatus at a location D, since a display area of an image at the location A disappears here, a control command for requesting transmission stop of moving image data is transmitted from the location D to the location A, and the communication apparatus 200 at the location A stops transmission of moving image data to the location D.

Figure 20:
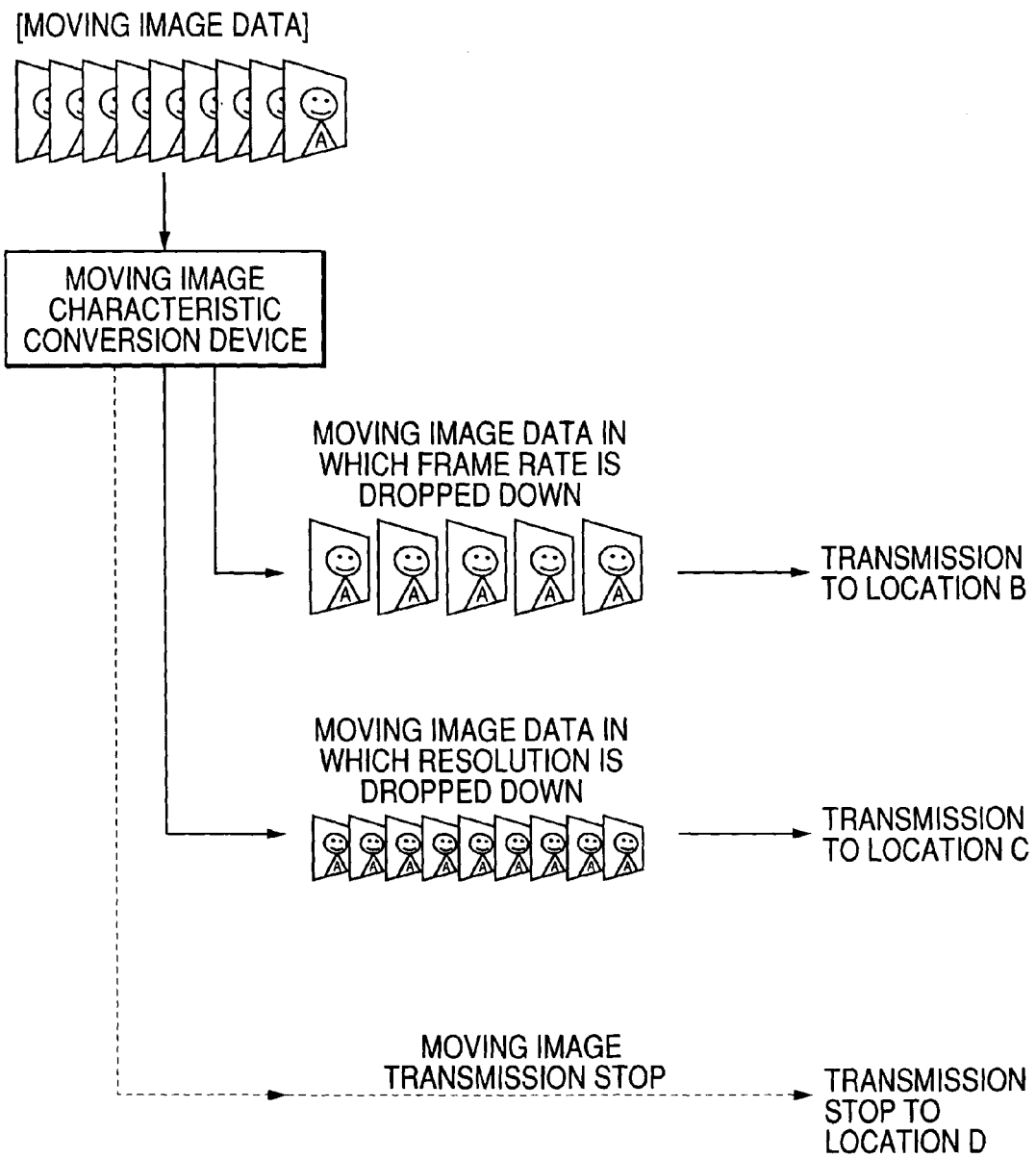
FIG. 20 is a view which conceptually shows a moving image data transmission control operation example, of the communication apparatus in the second embodiment of the invention.

As described above, since the communication apparatus 200 at the location A does not carry out unnecessary data transmission in transmission of moving image data to another communication apparatus to be connected, data transmission quantity is reduced. FIG. 20 is a view which conceptually shows a moving image data transmission control operation example of the above-described communication apparatus 200 at the location A. In accordance with a change of a display state of a screen of a communication apparatus to be connected, transmission quantity of moving image data is reduced, or transmission of moving image data is stopped.

In the meantime, for example, in case that, in FIG. 6, another window which is covering up a window of a TV conference system is closed, and in FIG. 7, a screen, which is located in a sub area, is displayed in a main area, control commands for instructing transmission restart of moving image data which is stopped to be transmitted, and restoration of a frame rate and resolution which had been lowered are transmitted from each communication apparatus to be connected. The communication apparatus 200 receives those control commands and carries out a transmission control operation of moving image data.

Third Embodiment

Next, a communication apparatus in a third embodiment of the invention will be described. The communication apparatus in the third embodiment of the invention differs, as compared to the communication apparatus in the second embodiment, on such a location that modification processing of a moving image characteristic of moving image data is limited to increase and decrease of a frame rate.

Figure 21:
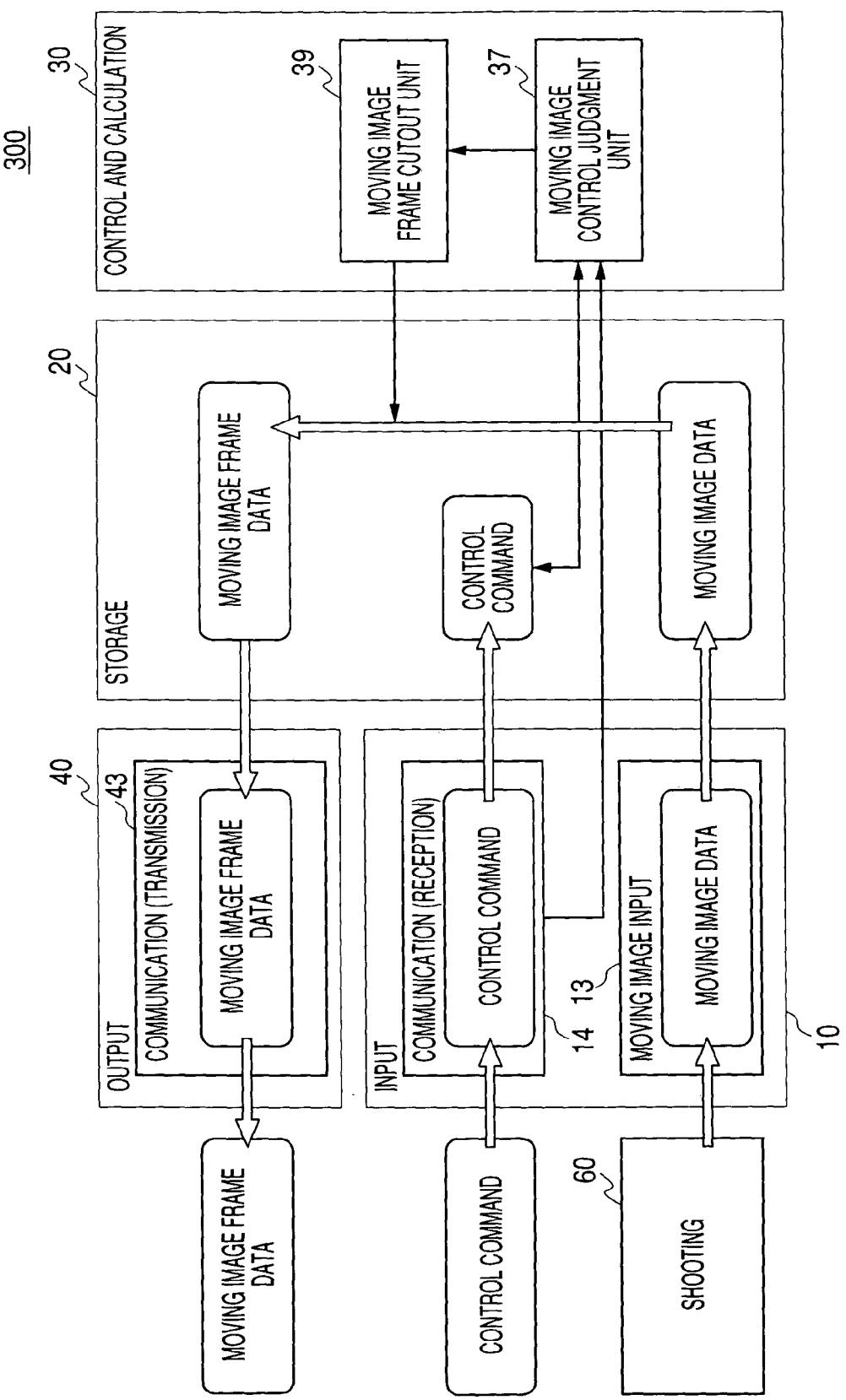
FIG. 21 is a view which shows a schematic configuration of a communication terminal in a third embodiment of the invention.

FIG. 21 is a view which shows a schematic configuration of a communication terminal in the third embodiment of the invention. A communication apparatus 300 differs, as compared to the communication apparatus 200 in the second embodiment, on such a location that the moving image characteristic conversion unit 38 is replaced by a moving image frame cutout unit 39. Since other configurations are the same as in the communication apparatus 200, explanations will be omitted.

The moving image frame cutout unit 39 converts a moving image characteristic of moving image data which is stored in the memory 20, by cutout of a frame rate, on the basis of a content of a control command, which is judged by the moving image control judgment unit 37.

A moving image data transmission control operation of the communication apparatus 300 of the above-described configuration will be described. As compared to the communication apparatus 200 of the second embodiment, it differs on such a location that conversion of a moving image characteristic of moving image data is carried out only by cutout of a frame rate, in the step S204 of the flow chart of FIG. 19. Since other means is the same as in the second embodiment, explanations will be omitted.

Explaining procedures from the step S204 up to the step S207, of the flow chart of FIG. 19 by a concrete example, for example, in case that a change of a screen configuration as shown in FIG. 6 is generated, on a monitor screen of a communication apparatus at a location B, since a display area of an image at a location A is decreased, a control command for requesting transmission of moving image data in which a data amount is reduced is sent from the location B to the location A, and the communication apparatus 300 at the location A transmits moving image data with the reduced frame rate, to the location B.

In addition, in case that a change of a screen configuration as shown in FIG. 8 is generated on a monitor screen of a communication apparatus at a location C, since a display area of an image at the location A is decreased also here, a control command for requesting transmission of moving image data in which a data amount is reduced is transmitted, from the location C, and the communication apparatus 300 at the location A transmits moving image data with the reduced frame rate, to the location C.

Further, in case that a change of a screen configuration as shown in FIG. 9 is generated on a monitor screen of a communication apparatus at a location D, since a display area of an image at the location A disappears here, a control command for requesting transmission stop of moving image data, from the location D, and the communication apparatus 300 at the location A stops transmission of moving image data to the location D.

Figure 22:
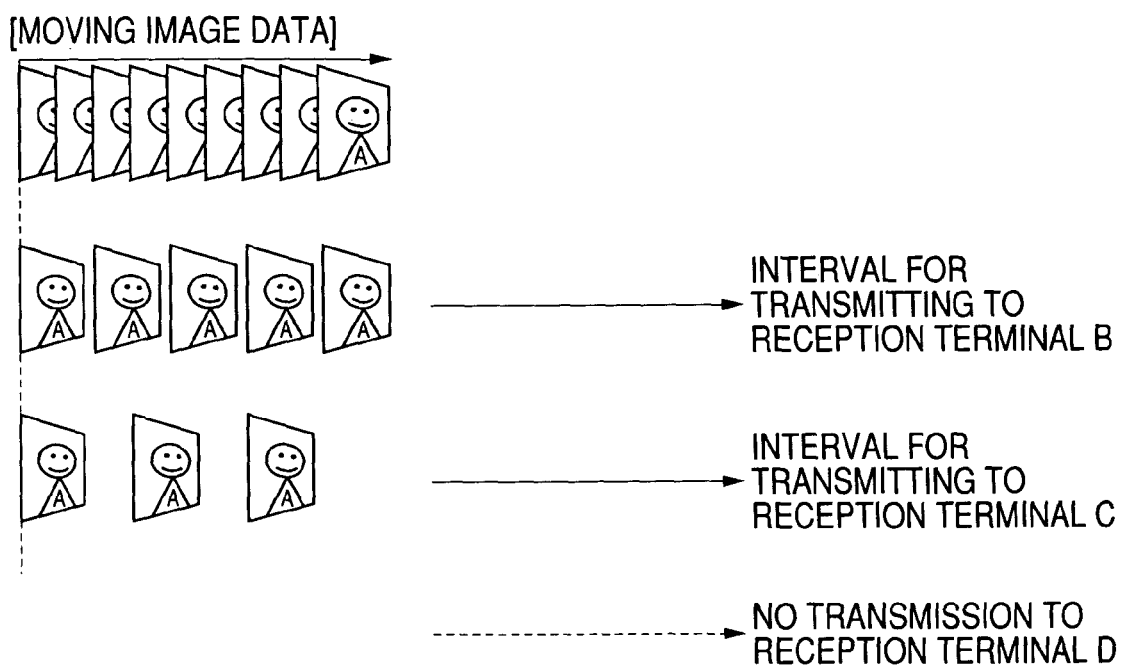
FIG. 22 is a view which conceptually shows a moving image data transmission control operation example, of the communication apparatus in the third embodiment of the invention.

As above, since the communication apparatus 300 does not carry out unnecessary data transmission in transmission of moving image data to another communication apparatus to be connected, data transmission quantity is reduced. FIG. 22 is a view which conceptually shows a moving image data transmission control operation example of the above-described communication apparatus 300 at the location A. In accordance with a change of a display state of a screen of a communication apparatus to be connected, a frame rate of moving image data is reduced, and transmission of moving image data is stopped.

In case that, in FIG. 6, another window which is covering up a window of a TV conference system is closed, and in FIG. 7, a screen, which is located in a sub area, is displayed in a main area, control commands for instructing transmission restart of moving image data which is stopped to be transmitted, and restoration of a frame rate which had been lowered are transmitted from each communication apparatus. The communication apparatus 300 receives those control commands, and carries out transmission restart of moving image data and restoration of a frame rate.

In the first through third embodiments described above, connection between a plurality of communication apparatuses may be of such a form that two apparatuses are directly connected by use of an exclusive line (so-called peer-to-peer connection), and may be of such a form that they are connected through a network, and both may be fine.

It is needless to say that a communication apparatus which relates to the invention is applicable to a communication apparatus which has both functions of the communication apparatus of the first embodiment and the communication apparatus of the second embodiment, i.e., a communication apparatus which is equipped with a camera as imaging means, a monitor as image display means, transmitting and receiving means of moving image data, display area change detecting means, transmitting and receiving means of control information, and moving image characteristic modifying means.

If the suchlike communication apparatus is used, over transmitting moving image data, which is generated by an own apparatus to another communication apparatus to be connected, at the same time, it is possible to receive moving image data which is transmitted from another communication apparatus to be connected.

As described above, according to the embodiments which relate to the invention, a communication apparatus, which becomes a transmission destination of moving image data, has display state detecting unit which detects a display state of an image to be displayed on the basis of moving image data which is received, and control information transmitting unit which transmits, to a transmission source of the moving image data, control information regarding transmission of the image data, in accordance with the display state, and a communication apparatus, which becomes a transmission source of moving image data, has moving image data transmitting unit which transmits moving image data to a transmission destination, control signal receiving unit which receives, from a transmission destination, control information including an instruction regarding transmission stop or transmission restart of the moving image data, or an instruction for adjusting a moving image characteristic of moving image data to be transmitted, and moving image characteristic converting unit which carries out transmission stop or transmission restart processing of moving image data, and converts a moving image characteristic of moving image data to be transmitted on the basis of the control information.

Accordingly, reception of unnecessary moving image data is controlled, by detecting a change of a display area of an image, and transmitting control information for stopping transmission of moving image data and reducing a data amount of moving image data to be transmitted to a communication apparatus which becomes a transmission source of moving image data, and it is possible to reduce data transmission quantity.

In addition, by stopping transmission of moving image data, and transmitting by reducing a data amount of moving image data, on the basis of control information which is received from a communication apparatus which becomes a transmission destination of moving image data, transmission of unnecessary moving image data is controlled, and it is possible to reduce data transmission quantity.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments are chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication apparatus comprising:
   a display area detecting unit that detects a display area of an image to be displayed on the basis of a received moving image data,
   wherein the display area is a dimension or a size of the image that is to be actually displayed,
   wherein the display area detecting unit detects a change of a display area of the image; and
   a control information transmitting unit that transmits, to a transmission source of the moving image data, control information regarding transmission of the image data, in accordance with the display area,
   wherein the control information transmitting unit transmits at least one of control information to stop transmitting or to restart transmitting the moving image data, control information to increase or decrease a frame rate of the moving image data, control information to change resolution of the moving image data and control information to increase or decrease a compression rate of the moving image data, and wherein the control information is generated in accordance with the change detected by the display area detecting unit.

2. The communication apparatus according to claim 1, wherein the display area detecting unit detects the display area being switched on the basis of an interrupt operation.

3. A communication apparatus comprising:

a moving image data transmitting unit that transmits moving image data to a transmission destination;

a control signal receiving unit that receives, from the transmission destination, control information including at least one of an instruction regarding transmission stop or transmission restart of the moving image data, an instruction regarding increasing or decreasing a frame rate of the moving image data, an instruction regarding changing resolution of the moving image data, an instruction regarding increasing or decreasing a compression rate of the moving image data and an instruction for adjusting a moving image characteristic of moving image data to be transmitted; and a moving image characteristic converting unit that stops and restarts transmission of the moving image data, and converts the moving image characteristic of the moving image data to be transmitted, wherein the moving image data is transmitted in accordance with a display area of an image to be displayed;

wherein the display area is a dimension or a size of the image that is to be actually displayed;

wherein the display area detecting unit detects a change of a display area of the image; and wherein the control information is generated in accordance with the change detected by the display area detecting unit.

4. The communication apparatus according to claim 3, wherein the moving image characteristic converting unit converts the moving image characteristic by increasing or decreasing a frame rate of the moving image data.

5. The communication apparatus according to claim 3, wherein the moving image characteristic converting unit converts the moving image characteristic by changing resolution of the moving image data.

6. The communication apparatus according to claim 3, wherein the moving image characteristic converting unit converts the moving image characteristic, by increasing and decreasing a compression rate of the moving image data.

7. The communication apparatus according to claim 3, wherein the moving image characteristic converting unit stops or restarts transmission of the moving image data, and converts the moving image characteristic of the moving image data to be transmitted, on the basis of the control information from a plurality of transmission destinations, with respect to each of the transmission destinations.

8. A communication method comprising:

transmitting moving image data to a transmission destination;

detecting a display area of an image to be displayed on the basis of the moving image data being received, wherein the display area is a dimension or a size of the image that is to be actually displayed and wherein the detecting the display area comprises detecting a change of a display area of the image;

transmitting control information to a transmission source in accordance with the display area;

receiving the control information from the transmission destination; and at least one of stopping or restarting transmission of the moving image data, increasing or decreasing a frame rate of the moving image data, changing resolution of the moving image data and increasing or decreasing a compression rate of the moving image data, and converting a moving image characteristic of the moving image data to be transmitted, on the basis of the control information; and wherein the control information is generated in accordance with the change detected by the detecting the display area.

9. A communication program product for causing a computer system to execute procedures comprising:

transmitting moving image data to a transmission destination;

detecting a display area of an image to be displayed on the basis of the moving image data being received, wherein the display area is a dimension or a size of the image that is to be actually displayed;

wherein the detecting the display area comprises detecting a change of a display area of the image;

transmitting control information to a transmission source in accordance with the display area;

receiving the control information from the transmission destination; and at least one of stopping or restarting transmission of the moving image data, increasing or decreasing a frame rate of the moving image data, changing resolution of the moving image data and increasing or decreasing a compression rate of the moving image data, and converting a moving image characteristic of the moving image data to be transmitted, on the basis of the control information; and wherein the control information is generated in accordance with the change detected by the detecting the display area.

* * * * *